(12) United States Patent
Hunter

(10) Patent No.: US 7,612,813 B2
(45) Date of Patent: Nov. 3, 2009

(54) AUTO EXPOSURE FOR DIGITAL IMAGERS

(75) Inventor: Kevin Hunter, Sunnyvale, CA (US)

(73) Assignee: Aptina Imaging Corporation (KY)

( * ) Notice: Subject to any disclaimer, the term of this patent is extended or adjusted under 35 U.S.C. 154(b) by 616 days.

(21) Appl. No.: 11/346,346

(22) Filed: Feb. 3, 2006

(65) Prior Publication Data
US 2007/0182845 A1 Aug. 9, 2007

(51) Int. Cl.
H04N 5/335 (2006.01)
H04N 3/14 (2006.01)

(52) U.S. Cl. ............... 348/297; 348/221.1; 348/229.1; 348/362

(58) Field of Classification Search ............ 348/362, 348/221.1, 229.1
See application file for complete search history.

(56) References Cited

U.S. PATENT DOCUMENTS

| 5,194,960 | A | * | 3/1993 | Ota ........................... 348/362 |
| 5,799,106 | A | | 8/1998 | Mooney et al. |
| 6,140,630 | A | | 10/2000 | Rhodes |
| 6,204,524 | B1 | | 3/2001 | Rhodes |
| 6,310,366 | B1 | | 10/2001 | Rhodes et al. |
| 6,326,652 | B1 | | 12/2001 | Rhodes |
| 6,333,205 | B1 | | 12/2001 | Rhodes |
| 6,376,868 | B1 | | 4/2002 | Rhodes |
| 6,816,200 | B1 | * | 11/2004 | Gough ..................... 348/362 |
| 7,251,057 | B2 | * | 7/2007 | Tsujino et al. ............ 358/1.9 |
| 2003/0146987 | A1 | | 8/2003 | Prentice et al. |
| 2003/0223010 | A1 | | 12/2003 | Kaplinsky et al. |
| 2004/0085475 | A1 | * | 5/2004 | Skow et al. ............... 348/362 |
| 2005/0041138 | A1 | * | 2/2005 | Suzuki ..................... 348/362 |
| 2005/0057666 | A1 | | 3/2005 | Hu et al. |
| 2005/0200921 | A1 | * | 9/2005 | Yuan et al. ................ 358/518 |
| 2005/0201634 | A1 | * | 9/2005 | Yuan et al. ................ 382/274 |
| 2006/0087581 | A1 | * | 4/2006 | Lin ........................... 348/364 |

OTHER PUBLICATIONS

Jeffrey Lubin et al., "Robust, Content-Dependent, High-Fidelity Watermark for Tracking in Digital Cinema," Electronic Imaging Symposium, Proceedings of SPIE, vol. 5020, Jan. 24, 2003.
Nathaniel McCaffrey, "CMOS Active Pixel Sensors with Extended Dynamic Range . . . for high-performance Machine Vision . . . ," Vision Show 2000, Sarnoff Corporation.

* cited by examiner

Primary Examiner—David L Ometz
Assistant Examiner—Angel L Garces-Rivera
(74) Attorney, Agent, or Firm—Dickstein Shapiro LLP

(57) ABSTRACT

An apparatus and method for performing automatic exposure control based on current measured luminance of an image and dynamic/modifiable target luminance levels. Exposure adjustments and/or adjustments to the dynamic/modifiable target luminance windows are based on the measured luminance and threshold settings to improve image quality while avoiding oscillations and other problems typically associated with automatic exposure.

29 Claims, 7 Drawing Sheets

AUTO EXPOSURE FOR DIGITAL IMAGERS

FIELD OF THE INVENTION

The invention relates generally to imaging devices and more particularly to improved automatic exposure control in an imaging device.

BACKGROUND

CMOS imagers are low cost imaging devices. A fully compatible CMOS sensor technology enabling a higher level of integration of an image array with associated processing circuits would be beneficial to many digital applications such as, for example, in cameras, scanners, machine vision systems, vehicle navigation systems, video telephones, computer input devices, surveillance systems, auto focus systems, star trackers, motion detection systems, image stabilization systems and data compression systems for high-definition television.

CMOS imagers have a low voltage operation and low power. consumption; CMOS imagers are compatible with integrated on-chip electronics (control logic and timing, image processing, and signal conditioning such as A/D conversion); CMOS imagers allow random access to the image data; and CMOS imagers have lower fabrication costs as compared with, for example, the conventional CCD since standard CMOS processing techniques can be used. Additionally, low power consumption is achieved for CMOS imagers because only one row of pixels at a time needs to be active during the readout and there is no charge transfer (and associated switching) from pixel to pixel during image acquisition. On-chip integration of electronics is particularly advantageous because of the potential to perform many signal conditioning functions in the digital domain (versus analog signal processing) as well as to achieve a reduction in system size and cost.

A CMOS imager circuit includes a focal plane array of pixel cells, each one of the cells including a photosensor, for example, a photogate, photoconductor or a photodiode overlying a substrate for accumulating photo-generated charge in the underlying portion of the substrate. Each pixel cell has a readout circuit that includes at least an output field effect transistor formed in the substrate and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state; (4) selection of a pixel for readout; and (5) output and amplification of a signal representing pixel charge. The charge at the storage region is typically converted to a pixel output voltage by the capacitance of the storage region and a source follower output transistor.

CMOS imagers of the type discussed above are generally known as discussed, for example, in U.S. Pat. Nos. 6,140,630, 6,376,868, 6,310,366, 6,326,652, 6,204,524 and 6,333,205, assigned to Micron Technology, Inc., which are hereby incorporated by reference in their entirety.

FIG. 1 illustrates a block diagram for a CMOS imager 10. The imager 10 includes a pixel array 20. The pixel array 20 comprises a plurality of pixels arranged in a predetermined number of columns and rows. The pixels of each row in array 20 are all turned on at the same time by a row select line and the pixels of each column are selectively output by a column select line. A plurality of row and column lines are provided for the entire array 20.

The row lines are selectively activated by the row driver 32 in response to row address decoder 30 and the column select lines are selectively activated by the column driver 36 in response to column address decoder 34. Thus, a row and column address is provided for each pixel. The CMOS imager 10 is operated by the control circuit 55, which controls address decoders 30, 34 for selecting the appropriate row and column lines for pixel readout, and row and column driver circuitry 32, 36, which apply driving voltage to the drive transistors of the selected row and column lines.

Each column contains sampling capacitors and switches 38 associated with the column driver 36 that reads a pixel reset signal Vrst and a pixel image signal Vsig for selected pixels. A differential signal (Vrst-Vsig) is produced by differential amplifier 40 for each pixel and is digitized by analog-to-digital converter 45 (ADC). The analog-to-digital converter 45 supplies the digitized pixel signals to an image processor 50, which forms a digital image output.

In order to maintain the quality and brightness of an image at an optimal level, the exposure and gain settings have to be continually adjusted for varying light conditions. Exposure is the duration for which the pixel sensor is capturing photons and accumulating induced electrons. Gain is the amount of analog amplification or attenuation that a pixel sensor signal undergoes. Amplification is where the gain is greater than one and attenuation is where the gain is less than one.

By varying the exposure and the gain of a pixel sensor, optimal images can be obtained from a sensor. For example, for the bright light conditions of a beach on a sunny day, the exposure would be set to a minimum and the gain to less than or equal to one. Similarly, if the image desired to be captured is a polar bear in a snow storm, the exposure would be set to a minimum and the gain to less than or equal to one. For dark conditions such as when trying to capture an image of a deer at night, the exposure would be set to a maximum and the gain to greater than or equal to one. Automatic exposure and gain control algorithms, however, carry the risk of oscillations. If the desired exposure and gain and the actual exposure and gain do not converge, then oscillations result, which adversely impact the captured image.

Accordingly, there is a need and desire for improved automatic exposure and gain control in imaging devices such as CMOS imagers.

SUMMARY

The invention provides improved automatic exposure and gain control in imaging devices such as CMOS imagers.

The above and other features and advantages are achieved in various exemplary embodiments of the invention by providing an apparatus and method for performing automatic exposure control based on current measured luminance of an image and dynamic/modifiable target luminance levels. Exposure adjustments and/or adjustments to the dynamic/modifiable target luminance windows are based on the measured luminance and threshold settings to improve image quality while avoiding oscillations and other problems typically associated with automatic exposure control.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

Figure 1:
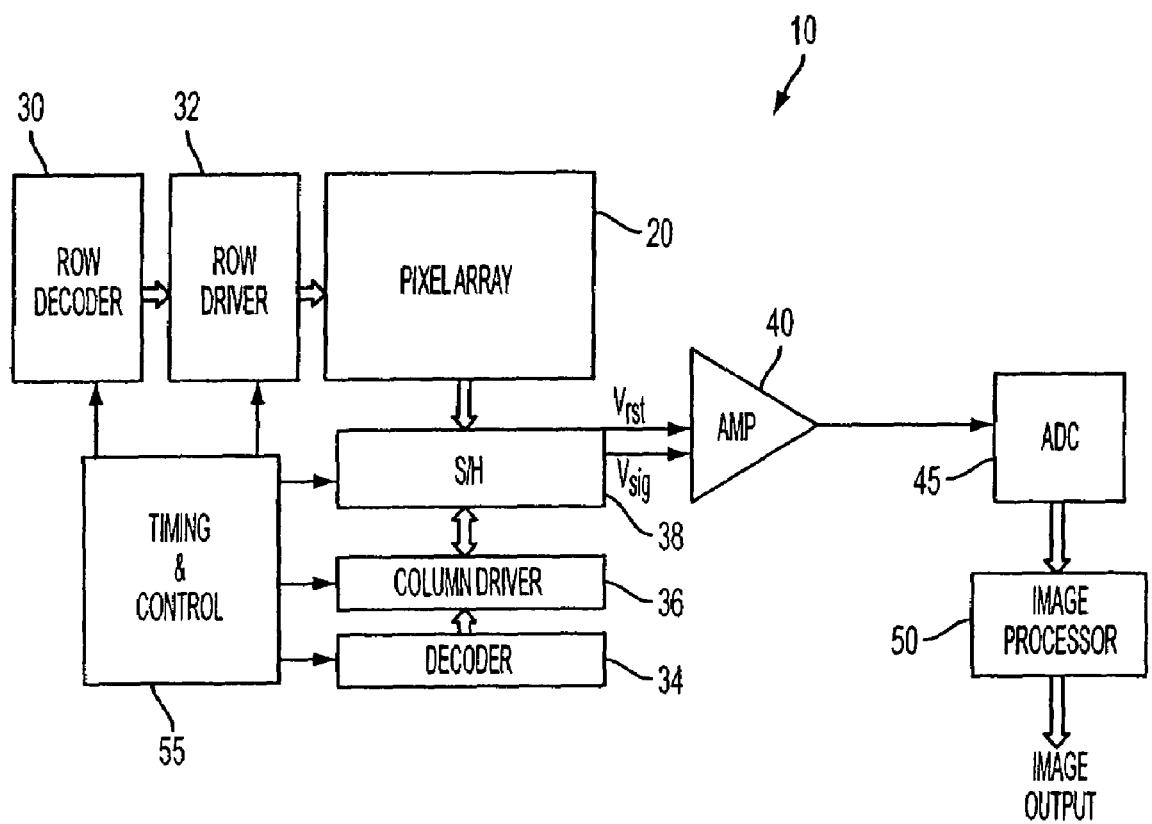
FIG. 1 is a block diagram illustrating a typical CMOS imager.
Figure 2:
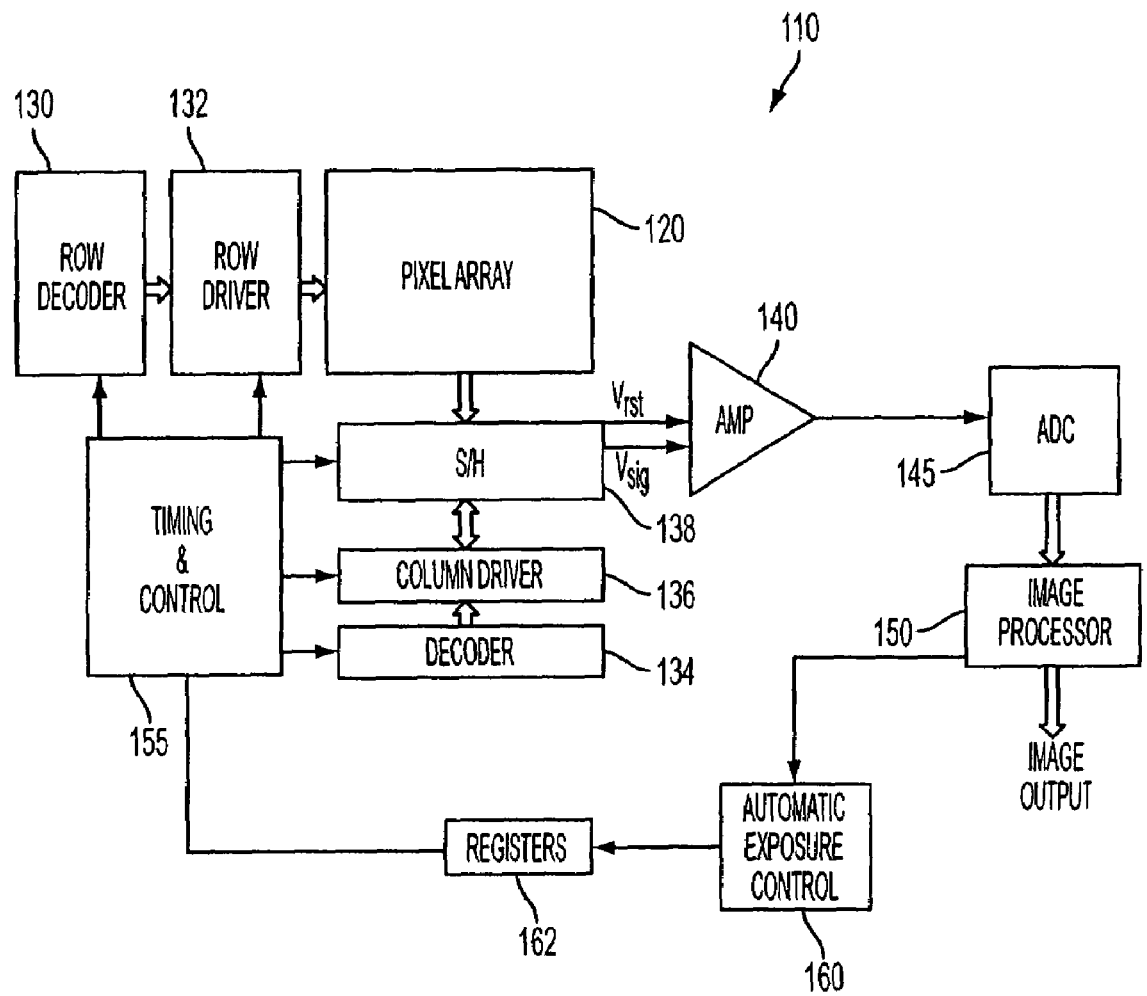
FIG. 2 is a block diagram illustrating a CMOS imager having automatic exposure control.

FIG. 2 illustrates a CMOS imager 110 having automatic exposure control. The imager 110 includes a pixel array 120 comprising a plurality of pixels arranged in a predetermined number of columns and rows. The pixels of each row in array 120 are all turned on at the same time by a row select line and the pixels of each column are selectively output by a column select line. A plurality of row and column lines are provided for the entire array 120.

The row lines are selectively activated by the row driver 132 in response to row address decoder 130 and the column select lines are selectively activated by the column driver 136 in response to column address decoder 134. Thus, a row and column address is provided for each pixel. The CMOS imager 110 is operated by the control circuit 155, which controls address decoders 130, 134 for selecting the appropriate row and column lines for pixel readout, and row and column driver circuitry 132, 136, which apply driving voltage to the drive transistors of the selected row and column lines.

Each column contains sampling capacitors and switches 138 associated with the column driver 136 that reads a pixel reset signal Vrst and a pixel image signal Vsig for selected pixels. A differential signal (Vrst-Vsig) is produced by differential amplifier 140 for each pixel and is digitized by analog-to-digital converter 145 (ADC). The analog-to-digital converter 145 supplies the digitized pixel signals to an image processor 150, which forms a digital image output.

To perform automatic exposure control, an automatic exposure control block 160 is connected to receive pixel signal information from the image processor 150. It should be appreciated that the automatic exposure control block 160 may be part of the image processor's 150 logic, or it may be a separate piece of hardware and/or logic. The output of the automatic exposure control block 160 is used to set registers 162 used by the timing and control circuit 155 to control image exposure and gain settings. An example of an imager containing automatic exposure and gain control can be found in U.S. Patent Application Publication no. 2005/0057666, which is hereby incorporated by reference.

Figure 3:
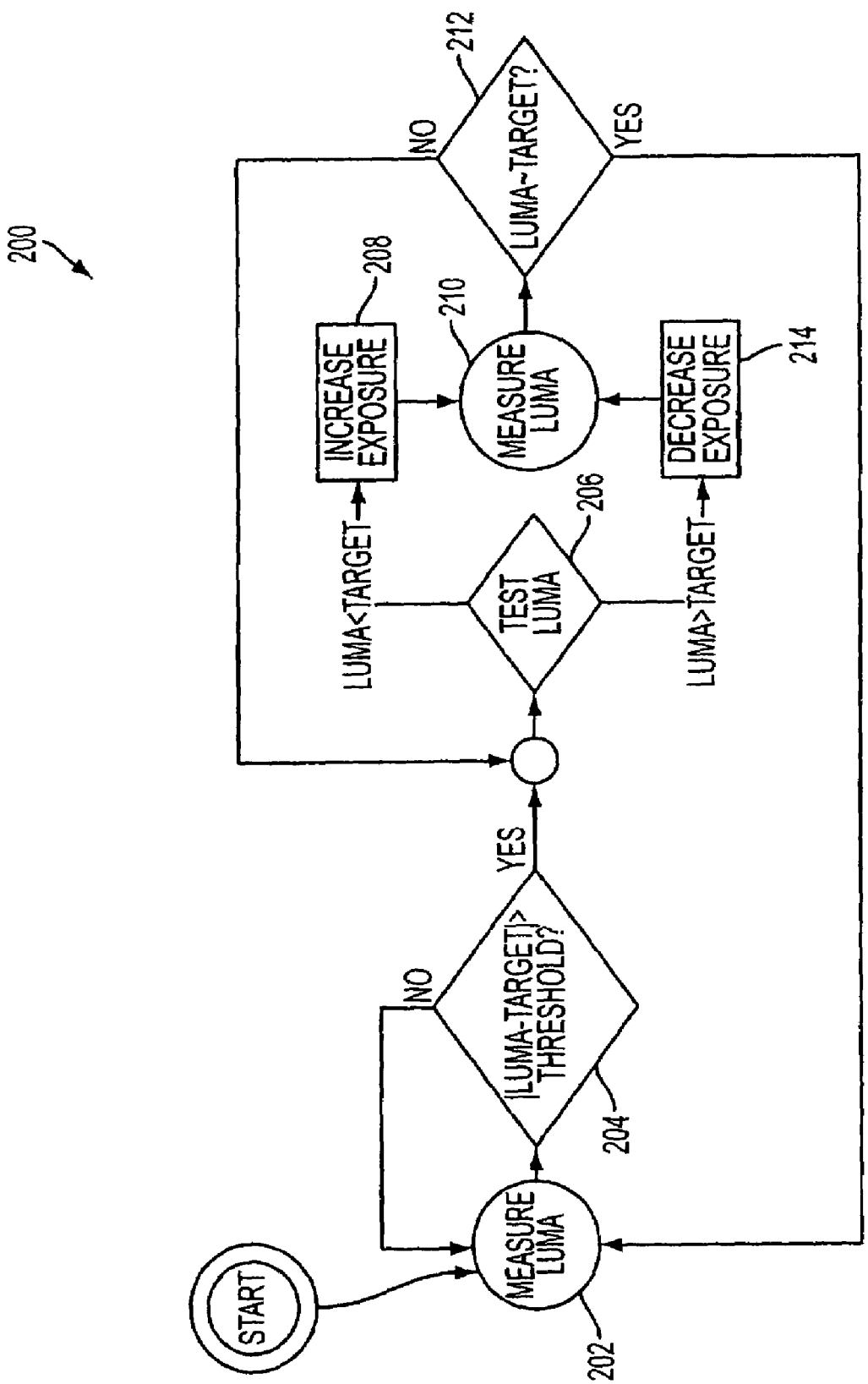
FIG. 3 illustrates an average-luminance-based method of performing automatic exposure control.

According to one method 200, illustrated in FIG. 3, the primary automatic exposure control technique is based upon measuring the center weighted average of the luminance of the image, and comparing the average to a desired static target luminance. Method 200 could be implemented in the automatic exposure control block 160 illustrated in FIG. 2. Luminance is a linear combination of the red, blue and green ("RGB") color components of an image. Luminance is typically referred to as Y for historical reasons. When the RGB components have been gamma corrected, then luminance Y is referred to as luma Y'. FIG. 3 illustrates "Luma" in method 200, but for convenience purposes only, the method 200 is now described with reference to luminance. It should be appreciated that luminance values or luma values could be used as desired.

A detailed explanation of method 200 now follows. At step 202, the image's luminance is measured and then compared to a static target luminance at step 204. This check serves as a threshold trigger that must be met before auto exposure takes place. That is, image statistics are observed, image frame by image frame, until the statistics deviate from a nominal condition by a predetermined amount. Specifically, step 204 determines if the absolute value of the difference between the measured luminance and the target luminance is greater than a predetermined threshold. If the absolute value of the difference between the measured luminance and the target luminance is not greater than the threshold, method 200 continues at step 202 where the image's luminance is measured again. If the absolute value of the difference between the measured luminance and the target luminance is greater than the threshold, method 200 continues at step 206 where the measured image luminance is compared to a test luminance. If the measured image luminance is less than the test luminance, image exposure time is increased (by setting the appropriate registers 162) at step 208. If the measured image luminance is greater than the test luminance, image exposure time is decreased (by setting the appropriate registers 162) at step 214.

Once the image exposure time has been increased/decreased, the image's luminance is measured again at step 210. At step 212, it is determined if the measured luminance is approximately equal to the target luminance (i.e., plus or minus a predetermined window). If the measured luminance is approximately equal to the target luminance, method 200 continues at step 202. If the measured luminance is not approximately equal to the target luminance, method 200 continues at step 206.

In general, method 200 is not robust enough and can lead to over and under exposed images. As such, method 200 is not desirable. A solution to this problem is to organize the pixel luminance statistics into a histogram, and use the histogram as the basis for exposure control, with the heuristic of pushing the exposure up to the point where pixels just begin to saturate (from excessive brightness). However, a full luminance histogram (with bins for every luminance value) is memory excessive and is also undesirable.

The inventor has devised a solution to the above automatic exposure control issues. As is explained below in more detail with respect to FIGS. 4 and 5, a smaller set of statistics, which directly pertain to image exposure, are obtained and processed by the present invention. In the present invention, exposure is moved in the proper direction by modest amounts over multiple frames.

In the following methods, luminance is computed from the red, green, and blue color components using the following formula (although other legitimate formulations of luminance exist):

Luminance=0.586*Green+0.301*Red+0.113*Blue    (1)

Instead of a full histogram, the present invention gathers four statistics. The first statistic is referred to as "current luminance" or "current average luminance," which is the sum of pixel luminance values, center weighted to increase the influence of pixels within a region of interest (ROI), and normalized by the count of all pixels sampled. The second statistic is referred to as the "current saturated luminance," which is the subset of the pixel luminance values that are "saturated" (pixels whose luminance value exceeds a high threshold), normalized by the count of all pixels collected (not the cardinality of the subset).

The above described prior center weighted average luminance method seeks to adjust exposure so that the measured current luminance is maintained within a range set by a target luminance±a luminance hysteresis. In other words, the stability window is static in position and width. The present invention, on the other hand, seeks to perform a similar analysis, but in addition, adjusts the target luminance value dynamically to support additional exposure criteria.

The additional exposure criteria include: (1) maintaining an exposure that results in a specified proportion (possibly 0%) of pixels being saturated; (2) bounding the target luminance on the high side to prevent excessive overlap of the luminance distribution with the saturated pixel range, which can occur in scene low dynamic range situations; and (3) bounding the target luminance on the low side to prevent excessive overlap of the luminance histogram with the black level, which can occur in scene high dynamic range situations.

The additional control settings necessary for the dynamic target luminance based method of the invention include: (1) a saturation threshold, which determines the threshold luminance value above which a pixel is collected as a part of the current saturated luminance statistic; (2) a saturation high water mark, which is the maximum proportion of saturated pixels considered acceptable in an image; (3) an upper limit on target luminance; and (4) a lower limit on target luminance.

In order to avoid feedback oscillations due to adjusting exposure and target luminance simultaneously, the dynamic target luminance method of the invention is applied as "polishing" steps to a center weighted average luminance method. Generally, these steps can be described as follows. For the first polishing step, when the current luminance moves outside the range of the target luminance stability window, the exposure is adjusted to move it back within bounds. The stability window for the target luminance extends from two exposure steps down from the target luminance to two exposure steps up from the target luminance. Regarding the second polishing step, when the current luminance moves just past the target luminance (i.e., the center of the hysteresis window), the dynamic target luminance kicks in (described below in more detail).

As a third polishing step, if the current saturated luminance is less than the saturation high water mark, then the target luminance is increased by one exposure step and the exposure settings are adjusted to track this change. This step is repeated in subsequent frames until the current saturated luminance is greater than or equal to the saturation high water mark, or the upper limit on target luminance is reached.

As a fourth polishing step, the target luminance is decreased by one exposure step and the exposure settings are adjusted to track this change. This step is repeated in subsequent frames until the current saturated luminance is less than the saturation high water mark, or the lower limit on target luminance is reached.

Figure 4:
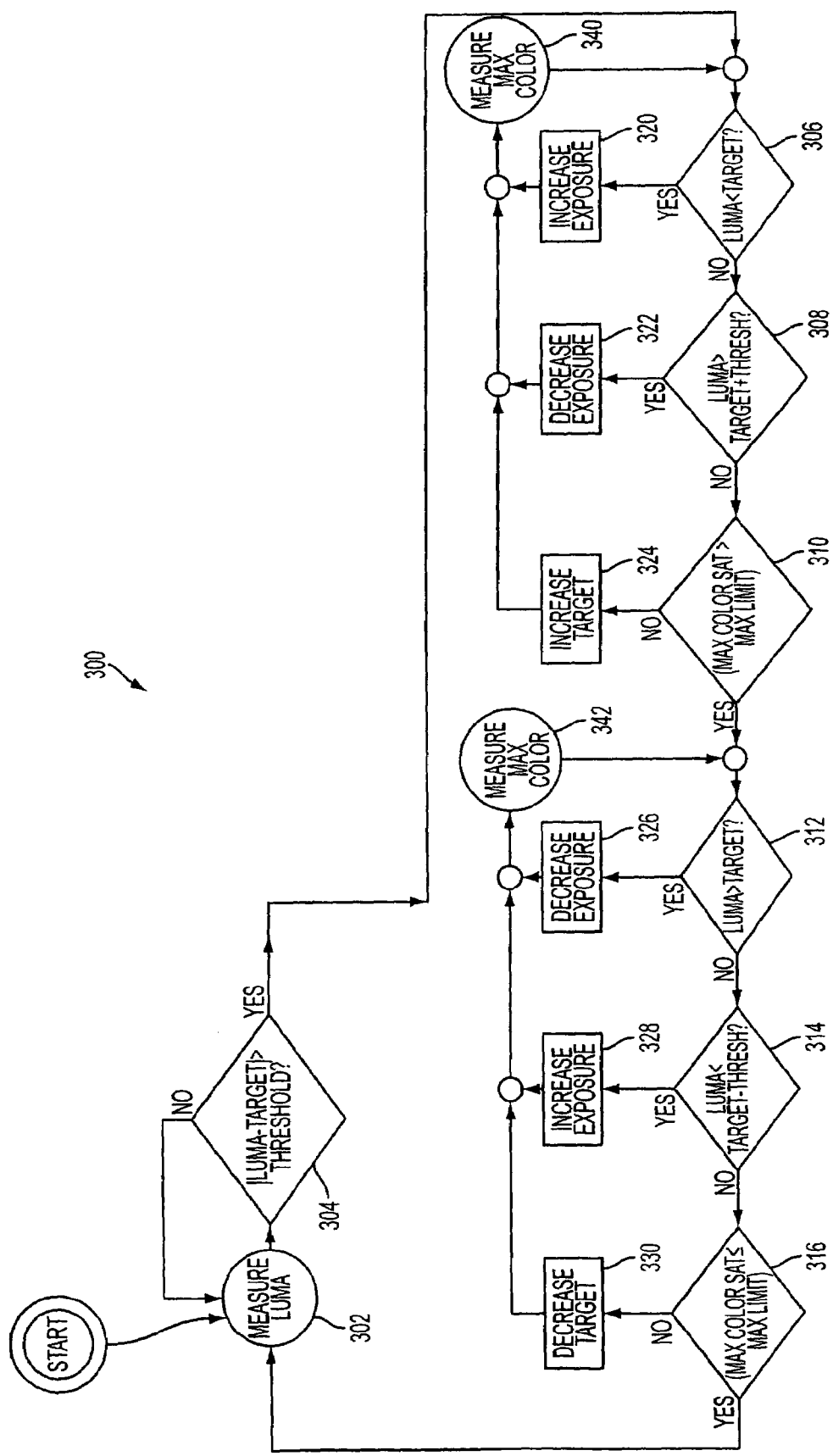
FIG. 4 illustrates an improved average-luminance-based method of performing automatic exposure control in accordance with a first exemplary embodiment of the invention.
Figure 5:
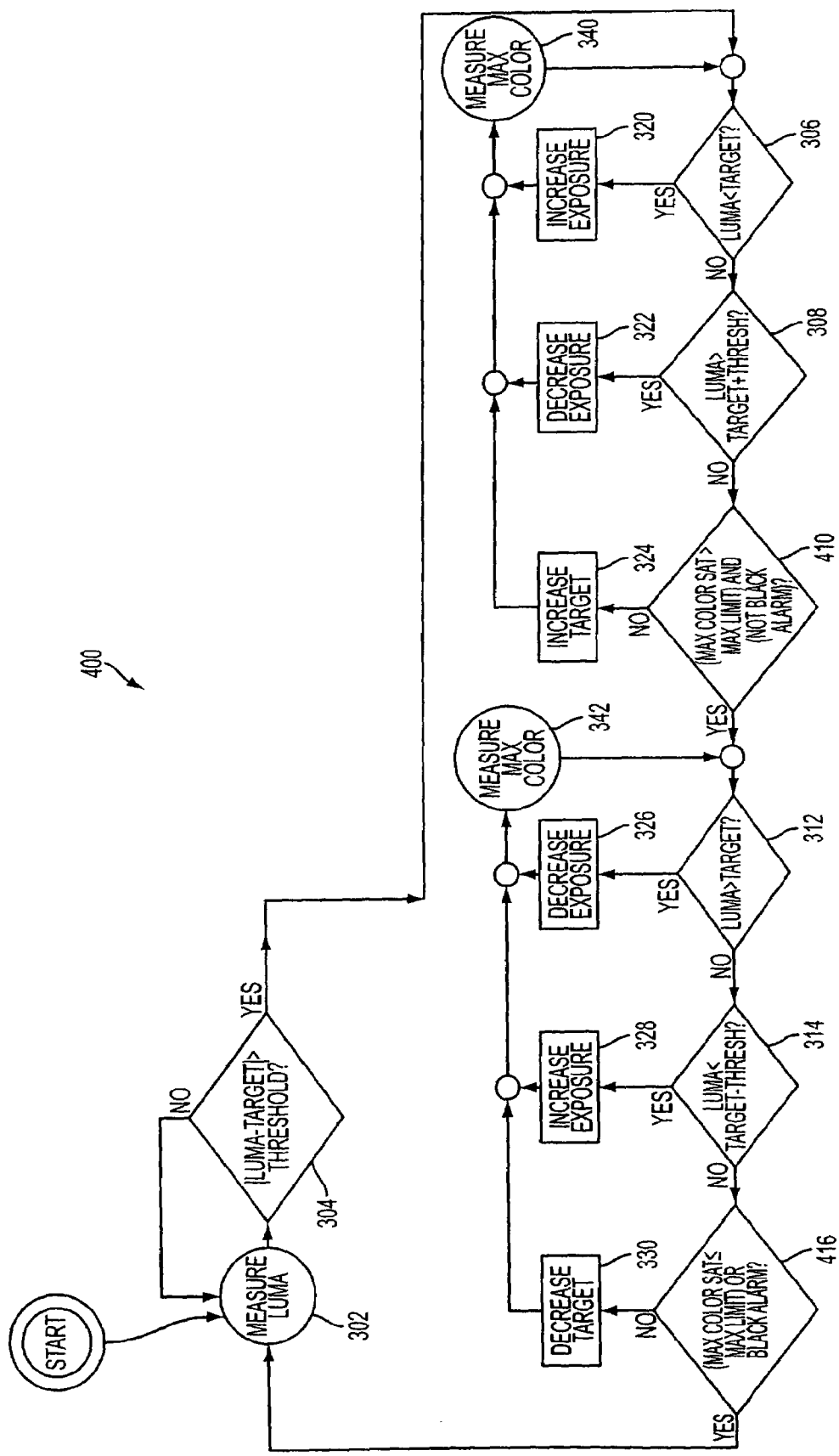
FIG. 5 illustrates an improved average-luminance-based method of performing automatic exposure control in accordance with a second exemplary embodiment of the invention.

With reference to FIG. 4, a method 300 of performing automatic exposure control having dynamic target luminance in accordance with an exemplary embodiment of the invention is now described. FIG. 4 illustrates "Luma" in method 300, but for convenience purposes only, the method 300 is now described with reference to luminance. In addition, for steps 306-316, max color component is substituted for luminance for all cases except for black and white pixel counts (described in more detail below with reference to FIGS. 4 and 5). It should be appreciated that luminance values or luma values could be used as desired. In addition, "maximum color saturation" as used below refers to the relative proportion of pixels whose maximum color component exceeds a saturation value. The method 300 may be executed by the automatic exposure control block 160 illustrated in FIG. 2.

At step 302, the image's luminance is measured and then compared to a target luminance at step 304. This check serves as a threshold trigger that must be met before auto exposure takes place. That is, image statistics are observed, image frame by image frame, until the statistics deviate from a nominal condition by a predetermined amount. Specifically, step 304 determines if the absolute value of the difference between the measured luminance and the target luminance is greater than a predetermined threshold. If the absolute value of the difference between the measured luminance and the target luminance is not greater than the threshold, method 300 continues at step 302 where the image's luminance is measured again. Measuring includes collecting the image statistics from a new frame or frames. If the absolute value of the difference between the measured luminance and the target luminance is greater than the threshold, method 300 continues at step 306 where it is determined if the measured image luminance is less than the target luminance. If the measured luminance is less than the target luminance, image exposure is increased by one step at step 320 and the method 300 continues at step 340 where the maximum color is measured. Measuring includes collecting all image statistics from a new frame or frames.

If at step 306, it is determined that the measured luminance (i.e., maximum color component) is not less than the target luminance, the method 300 continues at step 308 where it is determined if the measured luminance is greater than the target luminance plus a predetermined threshold. If it is determined that the measured luminance is greater than the target luminance plus the threshold, image exposure is decreased by one step at step 322 and the method continues at step 340.

If at step 308 it is determined that the measured luminance is not greater than the target luminance plus the threshold, method 300 continues at step 310 where the maximum color saturation is compared to the maximum limit. If the maximum color saturation is greater than the maximum limit, the target luminance is increased at step 324 and the method continues at step 340. If at step 310 the maximum color saturation is not greater than the maximum limit, the method 300 continues at step 312 where it is determined if the measured luminance is greater than the target luminance. If it is determined that the measured luminance is greater than the target luminance, image exposure is decreased by one step at step 326 and the method 300 continues at step 342 where the maximum color is measured. Measuring includes collecting all image statistics from a new frame or frames.

If at step 312 it is determined that the measured luminance is not greater than the target luminance, it is then determined if the measured luminance is less than the target luminance minus the threshold (step 314). If the measured luminance is less than the target luminance minus the threshold, the image exposure is increased by one step at step 328 and the method 300 continues at step 342. If the measured luminance is not less than the target luminance minus the threshold, method 300 continues at step 316 where the maximum color saturation is compared to the maximum limit. If the maximum color saturation is greater than the maximum limit, the target luminance is decreased at step 330 and the method 300 continues at step 342. If at step 316 the maximum color saturation is not greater than the maximum limit, the method 300 continues at step 302.

Thus, as can be seen from the FIG. 4 method 300, in a first exemplary embodiment of the invention, a dynamic target luminance is used to bolster the automatic exposure control of the invention. The illustrated embodiment, however, may be further refined to compensate for additional factors that may affect automatic exposure control. For example, testing has determined that when there is a large dynamic range of luminance values in the scene, small areas of very bright pixels could drive the exposure down to the point that the majority of the scene is underexposed. In order to address this issue, a "black alarm" is added to the FIG. 4 method 300 to produce method 400 (illustrated in FIG. 5). The black alarm seeks to maintain a balance between white (bright) pixels and black (dark) pixels. Generally, this corresponds to centering the dynamic range of the sensor within the larger dynamic range of the scene. Visually this means that some bright areas of the scene will be saturated, and some dark areas of the scene will be black.

In a preferred embodiment of the invention, the black alarm is added as an additional stopping criteria to step 316 (FIG. 4) to form step 416 of method 400. In addition, black alarm checking is also added to step 310 (FIG. 4) to form step 410 of method 400. If the count of the "black pixels" exceeds the count of the "white pixels" plus a "black pad" value, then the black alarm is triggered and further decreases in target luminance are prohibited.

The black pad is a bias to the black alarm calculation that minimizes the chance that small quantities of white and black pixels can destabilize the triggering of the black alarm. In the following explanation, it is assumed that we are analyzing a luminance histogram, the bulk of which is narrowly concentrated around a central luminance value. In addition, there are a few pixels that are very dark and a few pixels that are very bright. Random noise in the luminance distribution will shift the balance between white and black pixels practically on every frame. To keep this from happening, the black pad is added into the count of white pixels, to act as a tolerance. In other words, the number of black pixels must significantly exceed the number of white pixels before the black alarm is triggered. The black pad is implemented as a percentage of the total number of pixels collected, so that its value scales with the sample set cardinality.

The additional statistics collected for the black alarm implementation include: (1) a white count, which is a count of the number of pixels whose luminance value is greater than or equal to a white threshold value; and (2) a black count, which is a count of the number of pixels whose luminance value is less than or equal to a "black" threshold value.

The additional control settings necessary for the implementation of the black alarm include: (1) a white threshold, which determines the threshold luminance value above which a pixel increments the white count; (2) a black threshold, which determines the threshold luminance below which a pixel increments the black count; and (3) the black pad, which is a bias in the black alarm calculation that minimizes the chance that small quantities of white and black pixels can destabilize the triggering of the black alarm.

Luminance is the prime quantity being measured in the above methods 300, 400. The reason for controlling exposure based upon luminance saturation is the limited dynamic range of the pixels and the digital representation of the pixel values. Either the physical pixel well itself could saturate, or the analog-to-digital converter 145 (FIG. 2) could saturate.

Since the pixels come in three varieties (e.g., red, green, and blue), it follows that the individual color channels might saturate at different luminance values, due to variations in quantum efficiency, the amount of analog gain applied to individual color channels, and the differential contribution of the color channels to the luminance value. So if a sensor is pointed at a clear blue sky, the 11% contribution of the blue channel to the luminance means that the blue channel will saturate long before the luminance value itself saturates. This will be perceived as a shift in the sky color, as first the green then the red channels saturate with increasing exposure.

Figure 6:
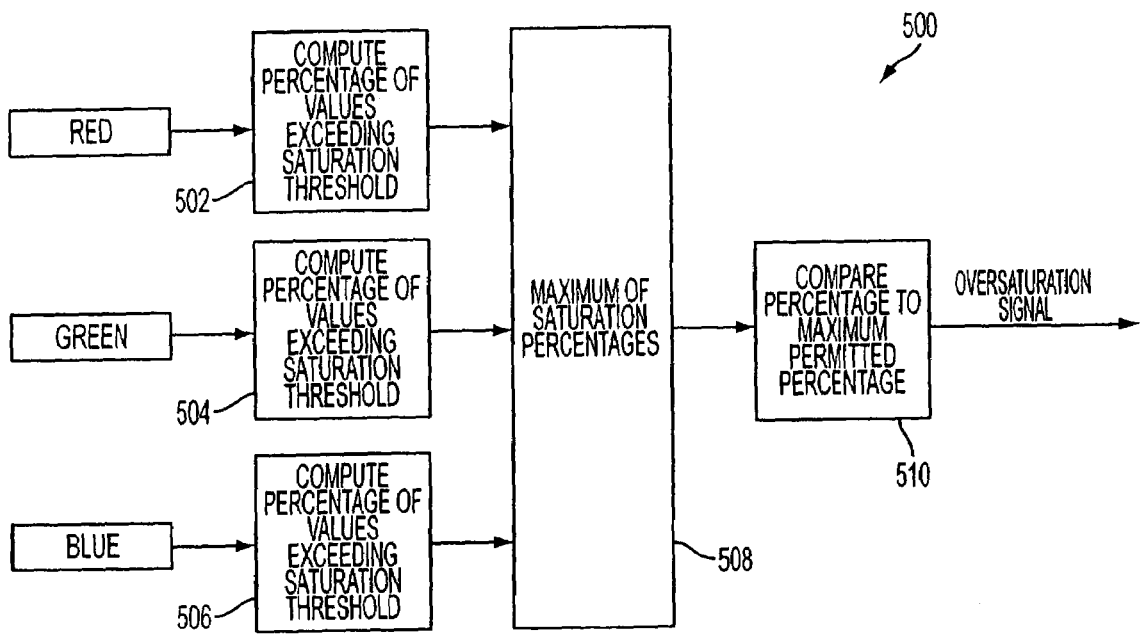
FIG. 6 illustrates a method of calculating maximum color in accordance with an exemplary embodiment of the invention.

There are several possible ways to replace luminance as the measured quantity in order to address the above issue. For example, referring now to method 500 illustrated in FIG. 6, separate saturation statistics for each color component may be collected (steps 502, 504, 506), and then the maximum of the three saturation percentages (step 508) is compared to the high water mark (i.e., maximum permitted percentage) at step 510.

Figure 7:
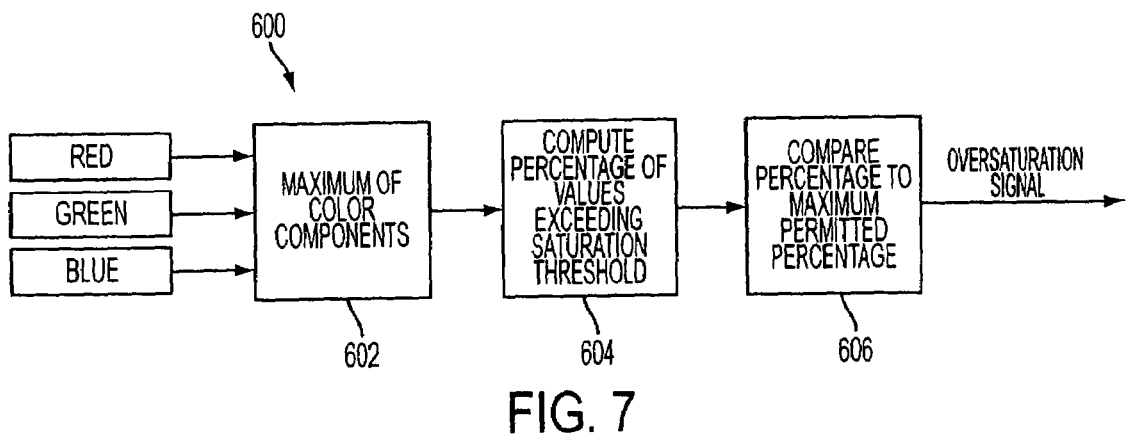
FIG. 7 illustrates a method of calculating maximum color in accordance with another exemplary embodiment of the invention.

An alternative method 600 is illustrated in FIG. 7. In method 600, the maximum of the three color components of each pixel is collected (step 602), instead of the luminance. The percentage of values exceeding a predetermined saturation threshold is computed (step 604) and compared to the high water mark (i.e., maximum permitted percentage) at step 606.

Figure 8:
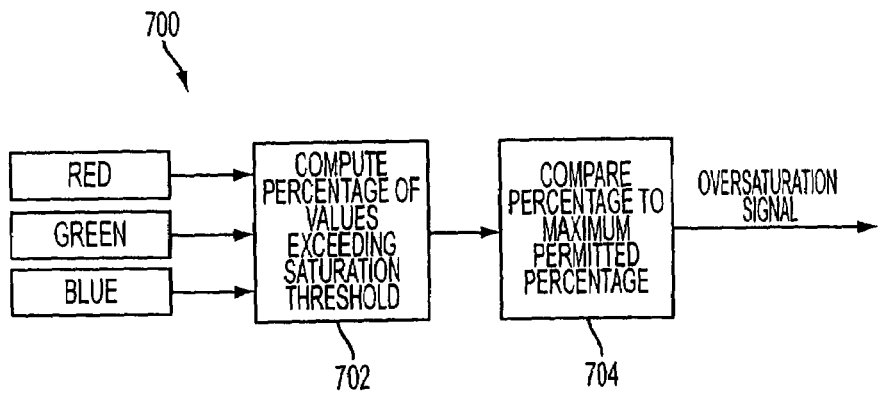
FIG. 8 illustrates a method of calculating maximum color in accordance with yet another exemplary embodiment of the invention.

FIG. 8 illustrates another alternative method 700 where all three components of each pixel are collected and treated like individual luminance values. The percentage of values exceeding a predetermined saturation threshold is computed (step 702) and compared to the high water mark (i.e., maximum permitted percentage) at step 704.

It should be notes that the RGB pixel colors experience at least one transformation (and possibly more) in color space. At the minimum, RGB information is converted to YCbCr color space via a linear transformation. This can be viewed as taking a three-dimensional RGB color cube, and then rotating and skewing the cube. The result is that there are colors in RGB color space that cannot be represented in YCbCr color space. This can be illustrated by thinking of the corners of the one color cube poking out the sides of the transformed color cube. The intersection of the two color spaces is known as the representable "gamut" of colors.

To address this, the non-representable colors are individually transformed into near analog colors of the destination color space. The approach usually taken is to de-saturate the color, i.e., make it more pastel by moving it closer to a gray color of similar luminance value. This process is sometimes referred to as color kill or color filtering.

The brighter a color is in luminance, the greater the chance that it might fall outside the destination color space. So if a scene is composed of highly color saturated (vibrant) colors, increasing the exposure increases the chances that pixels will need to be transformed to bring them back into gamut. Therefore, an additional criterion to limit the increase in exposure would be to measure how many pixels are being transformed, and if the percentage exceeds some threshold, prohibit further increases in target luminance.

The present invention has been described as increasing and decreasing exposure settings. It should be appreciated that the settings may be set via registers 162 (FIG. 2) or software tables/variables. It should be appreciated that the type of exposure adjustment step is application specific and should not limit the invention. One exemplary exposure adjustment step could include a step that is plus or minus $1/16^{th}$ the current exposure level. It should be appreciated that the predetermined thresholds, high water marks, etc. described above may also be programmable and stored in registers 162 (FIG. 2) or software tables/variables.

Figure 9:
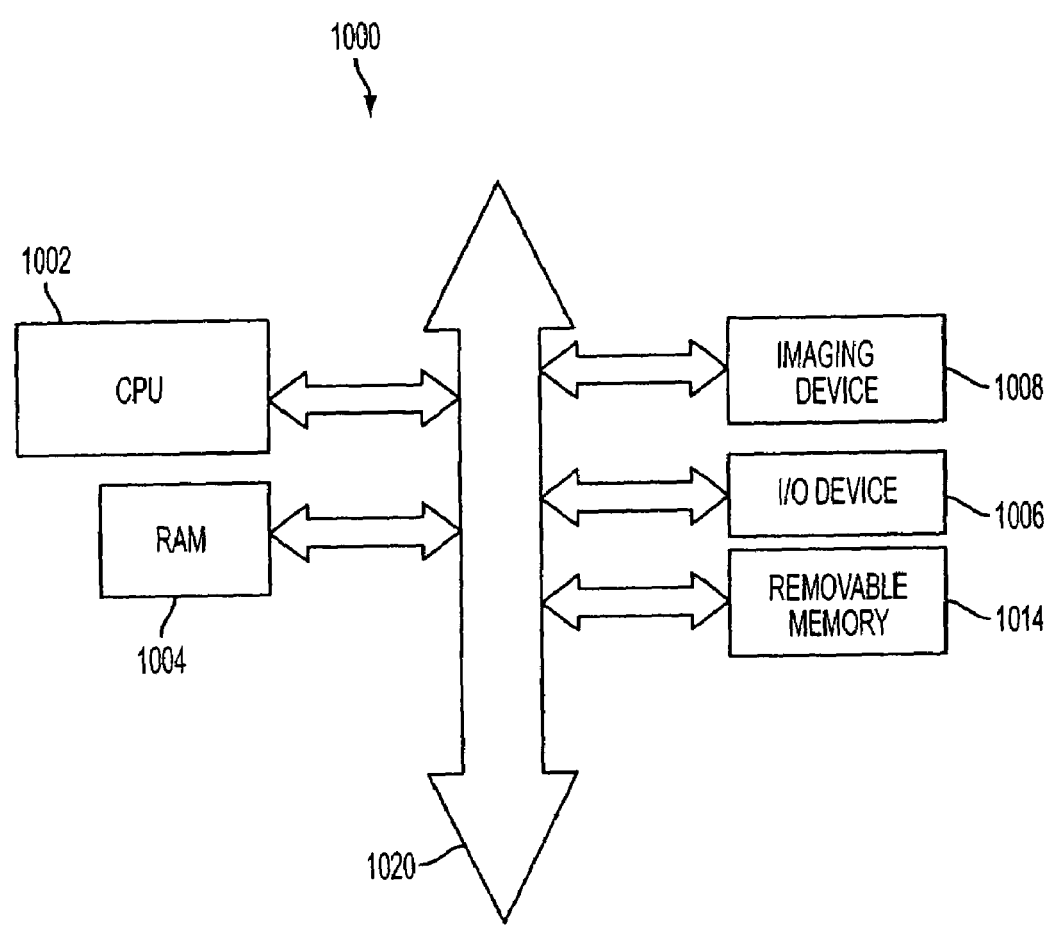
FIG. 9 shows a processor system incorporating at least one imaging device constructed in accordance with an embodiment of the invention.

FIG. 9 shows system 1000, a typical processor system modified to include an imaging device 1008 constructed in accordance with one of the embodiments of the invention (i.e., CMOS imager 110 illustrated in FIG. 2 performing one of or a combination of the automatic exposure control methods 300, 400, 500, 600 and 700 of the invention). The processor system 1000 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 1000, for example a camera system, generally comprises a central processing unit (CPU) 1002, such as a microprocessor, that communicates with an input/output (I/O) device 1006 over a bus 1020. Imaging device 1008 also communicates with the CPU 1002 over the bus 1020. The processor system 1000 also includes random access memory (RAM) 1004, and can include removable memory 1014, such as flash memory, which also communicate with the CPU 1002 over the bus 1020. The imaging device 1008 may be combined with a processor, such as a CPU, digital signal processor, or microprocessor, with or without memory storage on a single integrated circuit or on a different chip than the processor. It should be appreciated that the invention may be implemented in other imaging devices such as e.g., CCD imagers. Thus, the invention is not limited to the illustrated CMOS imager examples.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. A processor implemented method of performing automatic exposure control for an imager, said method comprising the steps of:
    inputting into the processor a current luminance of an image captured by the imager;
    comparing in the processor the current luminance to an adjustable target luminance level;
    measuring a maximum color saturation;
    determining if the maximum color saturation is greater than a maximum saturation limit; and
    adjusting via the processor one of an image exposure setting and the target luminance level based on results of the comparing and determining steps,
    wherein said adjusting step increases the target luminance level if it is determined that the maximum color saturation is not greater than the maximum saturation limit.

2. The method of claim 1, wherein said comparing step comprises determining if the current luminance is less than the target luminance level and said adjusting step comprises increasing the exposure setting if it is determined that the current luminance is less than the target luminance level.

3. The method of claim 1, wherein said comparing step comprises determining if the current luminance is greater than the target luminance level plus a predetermined threshold and said adjusting step comprises decreasing the exposure setting if it is determined that the current luminance is greater than the target luminance level plus the threshold.

4. The method of claim 1, wherein said comparing step further comprises the act of determining if a black alarm condition has occurred and said adjusting step comprises increasing the target luminance level if it is determined that if the black alarm condition has occurred.

5. The method of claim 1, further comprising the acts of:
    inputting into the processor a new current luminance of the image;
    comparing in the processor the new current luminance to the adjustable target luminance level;
    measuring the maximum color saturation;
    determining if the maximum color saturation is greater than the maximum saturation limit; and
    adjusting via the processor one of the image exposure setting and the target luminance level.

6. The method of claim 5, wherein said step of comparing the new current luminance to the adjustable target luminance level comprises determining if the new current luminance is greater than the target luminance level and said second adjusting step comprises decreasing the exposure setting if it is determined that the new current luminance is greater than the target luminance level.

7. The method of claim 5, wherein said step of comparing the new current luminance to the adjustable target luminance level comprises determining if the new current luminance is less than the target luminance level minus a predetermined threshold and said second adjusting step comprises increasing the exposure setting if it is determined that the new current luminance is less than the target luminance level minus the threshold.

8. The method of claim 5, wherein said step of comparing the new current luminance to the adjustable target luminance level further comprises determining if the maximum color saturation is less than or equal to a maximum saturation limit and said second adjusting step further comprises the act of decreasing the target luminance level if it is determined that the maximum color saturation is greater than the maximum saturation limit.

9. The method of claim 5, wherein said step of comparing the new current luminance to the adjustable target luminance level further comprises determining if the maximum color saturation is less than or equal to a maximum saturation limit or if a black alarm condition has occurred, and said second adjusting step further comprises the act of decreasing the target luminance level if it is determined that the maximum color saturation is greater than the maximum saturation limit and the black alarm condition has not occurred.

10. An imaging device comprising:
    an array of pixels for capturing an image;
    image processing circuitry for obtaining current luminance of the image; and
    an automatic exposure control block connected to said image processing circuit, said automatic exposure control block compares the current luminance to an adjustable target luminance level, measures a maximum color saturation, determines if the maximum color saturation is greater than a maximum saturation limit, and adjusts one of an image exposure setting and the target luminance level based on results of the comparison and maximum color determination, said automatic exposure block increasing the target luminance level if it is determined that the maximum color saturation is not greater than the maximum saturation limit.

11. The device of claim 10, wherein said automatic exposure control block determines if the current luminance is less than the target luminance level and increases the exposure setting if it is determined that the current luminance is less than the target luminance level.

12. The device of claim 10, wherein said automatic exposure control block determines if the current luminance is greater than the target luminance level plus a predetermined threshold and decreases the exposure setting if it is determined that the current luminance is greater than the target luminance level plus the threshold.

13. The device of claim 10, wherein said automatic exposure control block further determines if a black alarm condition has occurred and increases the target luminance level if it is determined that if the black alarm condition has occurred.

14. The device of claim 10, wherein said image processing circuitry obtains a new current luminance of the image, measures the maximum color saturation, determines if the maximum color saturation is greater than the maximum saturation limit, compares the new current luminance to the adjustable target luminance level and adjusts one of the image exposure setting and the target luminance level.

15. The device of claim 14, wherein said automatic exposure control block determines if the new current luminance is greater than the target luminance level and decreases the exposure setting if it is determined that the new current luminance is greater than the target luminance level.

16. The device of claim 14, wherein said automatic exposure control block determines if the new current luminance is less than the target luminance level minus a predetermined threshold and increases the exposure setting if it is determined that the new current luminance is less than the target luminance level minus the threshold.

17. The device of claim 14, wherein said automatic exposure control block determines if the maximum color saturation is less than or equal to a maximum saturation limit and decreases the target luminance level if it is determined that the maximum color saturation is greater than the maximum saturation limit.

18. The device of claim 14, wherein said automatic exposure control block determines if the maximum color saturation is less than or equal to a maximum saturation limit or if a black alarm condition has occurred, and decreases the target luminance level if it is determined that the maximum color saturation is greater than the maximum saturation limit and the black alarm condition has not occurred.

19. The device of claim 10 further comprising registers, said registers storing said exposure setting and target luminance level.

20. A system comprising:
a processor; and
and an imaging device coupled to said processor, said imaging device comprising:
an array of pixels for capturing an image,
image processing circuitry for obtaining current luminance of the image, and
an automatic exposure control block connected to said image processing circuit, said automatic exposure control block compares the current luminance to an adjustable target luminance level, measures a maximum color saturation, determines if the maximum color saturation is greater than a maximum saturation limit, and adjusts one of an image exposure setting and the target luminance level based on results of the comparison and maximum color determination, said automatic exposure block increasing the target luminance level if it is determined that the maximum color saturation is not greater than the maximum saturation limit.

21. The system of claim 20, wherein said automatic exposure control block determines if the current luminance is less than the target luminance level and increases the exposure setting if it is determined that the current luminance is less than the target luminance level.

22. The system of claim 20, wherein said automatic exposure control block determines if the current luminance is greater than the target luminance level plus a predetermined threshold and decreases the exposure setting if it is determined that the current luminance is greater than the target luminance level plus the threshold.

23. The system of claim 20, wherein said automatic exposure control block further determines if a black alarm condition has occurred and increases the target luminance level if it is determined that if the black alarm condition has occurred.

24. The system of claim 20, wherein said image processing circuitry obtains a new current luminance of the image, measures the maximum color saturation, determines if the maximum color saturation is greater than the maximum saturation limit, compares the new current luminance to the adjustable target luminance level and adjusts one of the image exposure setting and the target luminance level.

25. The system of claim 24, wherein said automatic exposure control block determines if the new current luminance is greater than the target luminance level and decreases the exposure setting if it is determined that the new current luminance is greater than the target luminance level.

26. The system of claim 24, wherein said automatic exposure control block determines if the new current luminance is less than the target luminance level minus a predetermined threshold and increases the exposure setting if it is determined that the new current luminance is less than the target luminance level minus the threshold.

27. The system of claim 24, wherein said automatic exposure control block determines if the maximum color saturation is less than or equal to a maximum saturation limit and decreases the target luminance level if it is determined that the maximum color saturation is greater than the maximum saturation limit.

28. The system of claim 24, wherein said automatic exposure control block determines if the maximum color saturation is less than or equal to a maximum saturation limit or if a black alarm condition has occurred, and decreases the target luminance level if it is determined that the maximum color saturation is greater than the maximum saturation limit and the black alarm condition has not occurred.

29. The system of claim 20, wherein said imaging device further comprises registers, said registers storing said exposure setting and target luminance level.

* * * * *